March 3, 1970 E. J. HAMMOND ET AL 3,498,624
CHUCK DEVICE
Filed Sept. 21, 1967 5 Sheets-Sheet 1

INVENTORS
ROLAND G. KOCH
EARL J. HAMMOND
BY
Learman, Learman & McCulloch
ATTORNEYS

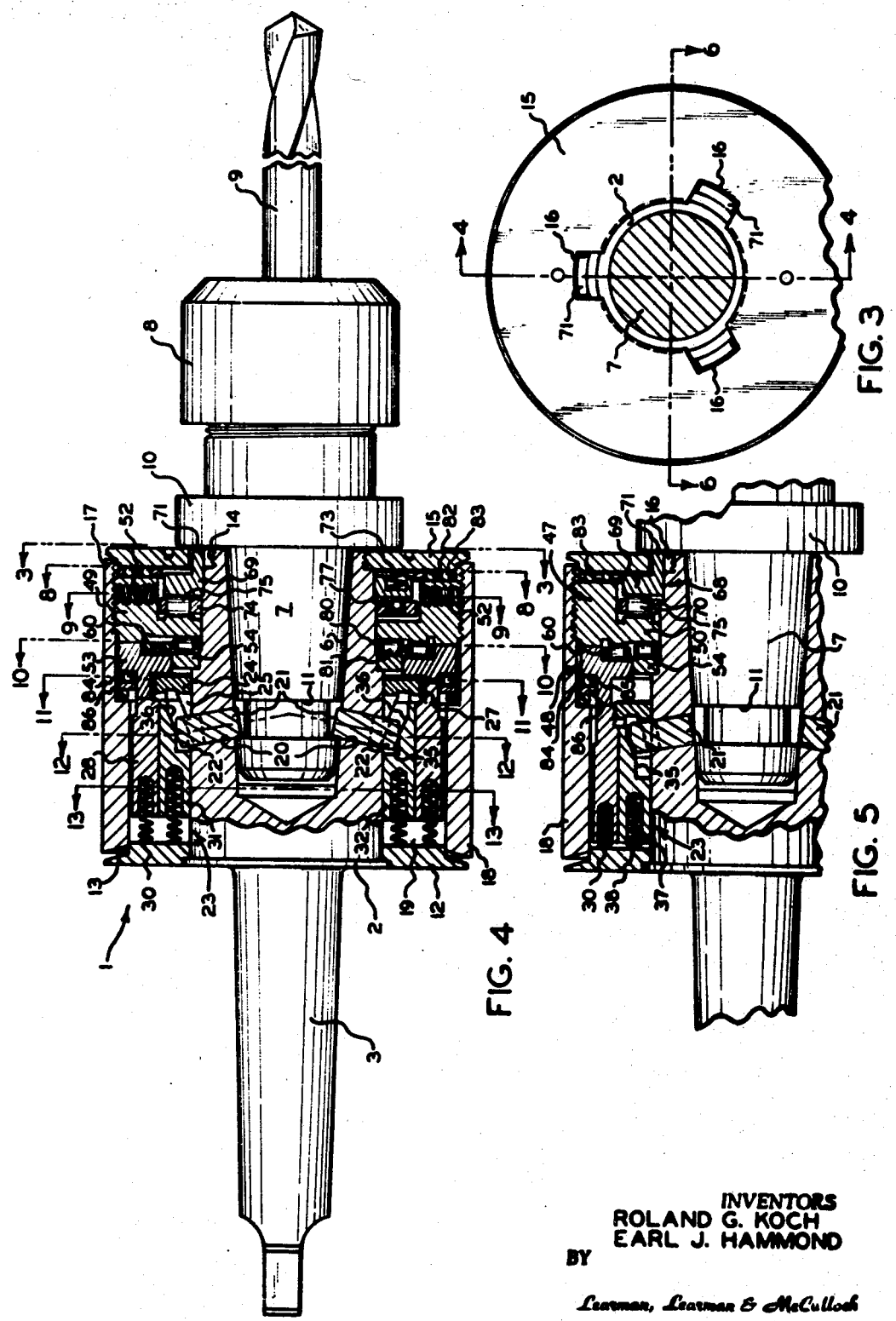

March 3, 1970  E. J. HAMMOND ET AL  3,498,624
CHUCK DEVICE
Filed Sept. 21, 1967  5 Sheets-Sheet 3
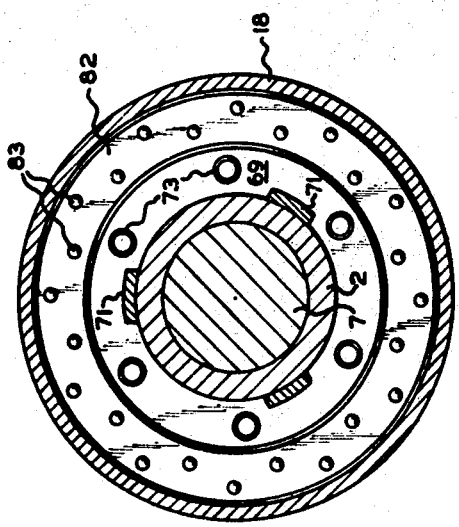
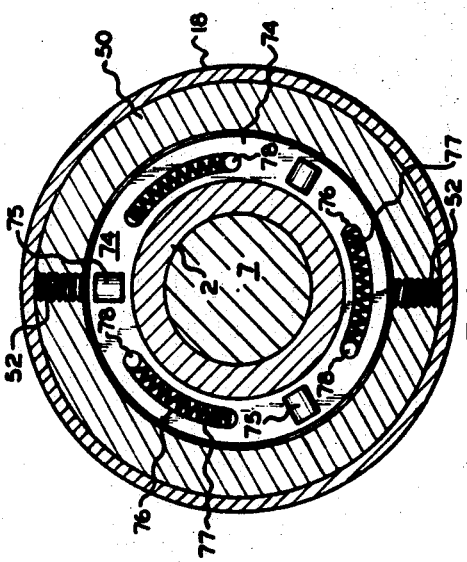
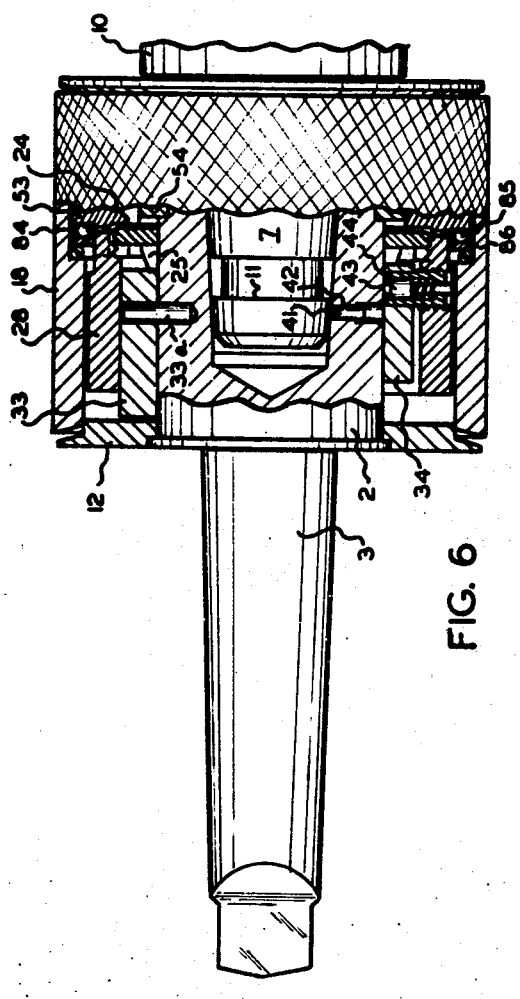
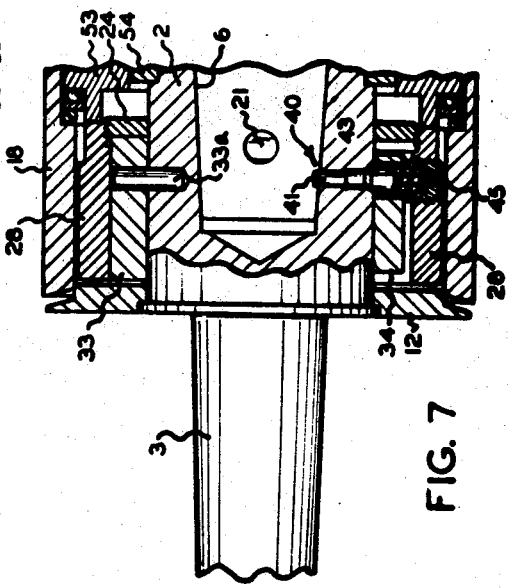
INVENTORS
ROLAND G. KOCH
EARL J. HAMMOND
BY
ATTORNEYS

*INVENTOR.*
ROLAND G. KOCH
EARL J. HAMMOND
BY
*Learman, Learman & McCulloch*
ATTORNEYS

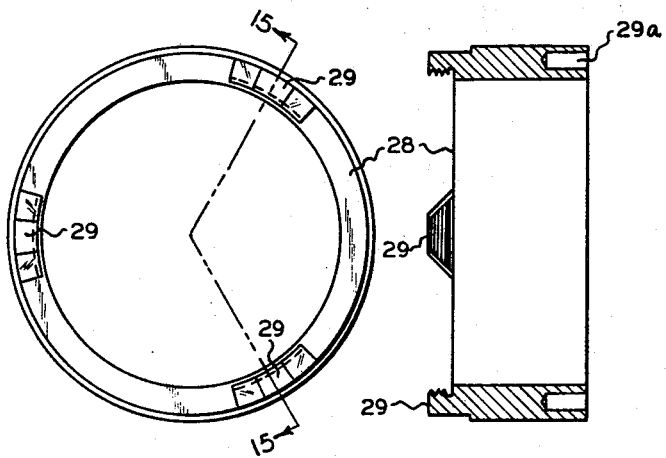
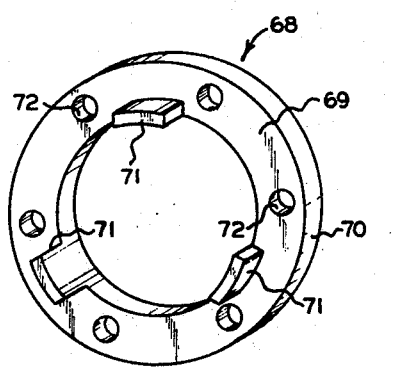
FIG. 16  FIG. 17  FIG. 18
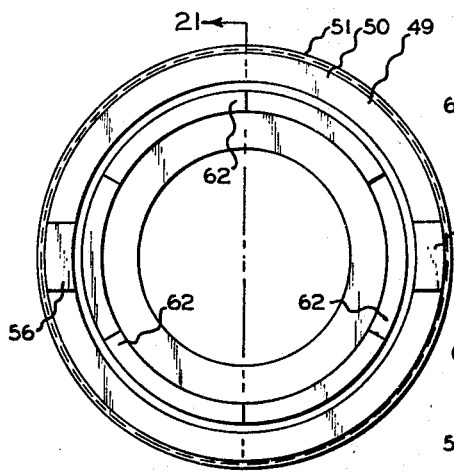
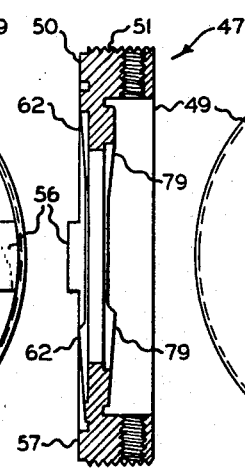
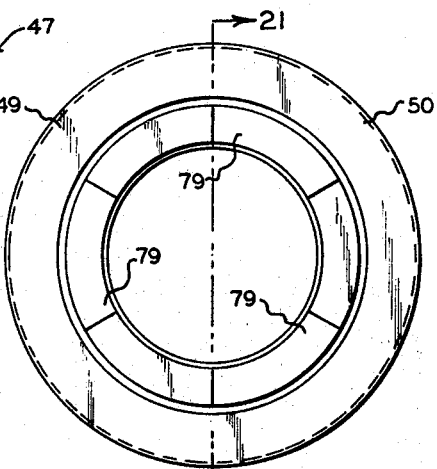
FIG. 19  FIG. 21  FIG. 20
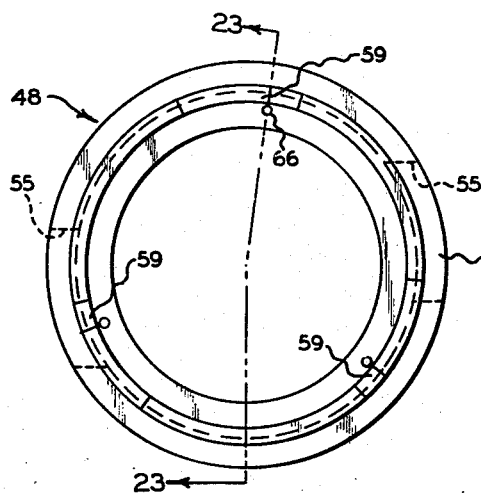
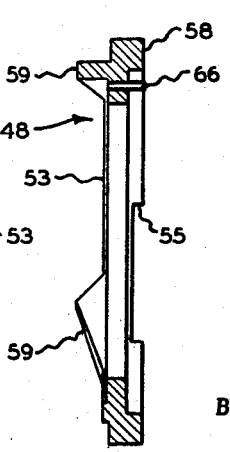
FIG. 22  FIG. 23
INVENTORS
ROLAND G. KOCH
EARL J. HAMMOND
BY
Learman, Learman & McCulloch
ATTORNEYS

United States Patent Office

3,498,624
Patented Mar. 3, 1970

3,498,624
CHUCK DEVICE
Earl J. Hammond and Roland G. Koch, Frankenmuth, Mich., assignors to Universal Engineering Company, Frankenmuth, Mich., a corporation of Michigan
Filed Sept. 21, 1967, Ser. No. 669,544
Int. Cl. B23b *31/16, 31/12*
U.S. Cl. 279—81        20 Claims

ABSTRACT OF THE DISCLOSURE

A chuck having locking dogs movable into and out of latching engagement with a removable tool holder and having a freely rotatable, manually operable operating member mounted on the chuck for moving the locking dogs in timed relation out of locking engagement with the tool holder, and including an ejecting member movable by the operating member into engagement with the tool holder to eject the latter from the chuck following movement of the locking dogs to their unlocking position.

---

The invention disclosed herein comprises a chuck for the releasable accommodation of a tool holder or tool and which is adapted to be connected to a rotary spindle of a machine tool. Chucks of the general class to which the invention relates have been proposed heretofore but have had some disadvantages. For example, some chucks have necessitated stopping of the spindle of the machine tool in order to effect changing of the tool or tool holder supported by the chuck. Other chucks have been capable of enabling a tool or tool holder to be changed without necessitating stopping of the machine spindle, but in such cases it has been necessary for the operator to grip some continuously rotating part of the chuck during its rotation and either slow or stop the rotation of such part, together with the apparatus controlled thereby, to effect removal of the tool or tool holder from the chuck. The necessity of the operator's having to grip and stop or slow rotation of a rotating part and its associated apparatus may cause the operator's hands to be burned or chafed.

An object of this invention is to provide a chuck having means for locking therein a tool or tool holder and which is provided with means for operating the locking mechanism without necessitating discontinuing rotation of the chuck and without subjecting the operator to the likelihood of injury.

Another object of the invention is to provide a chuck of the character described and wherein the tool locking means may be moved automatically from a retracted, inoperative position to a locking position in response to the introduction of a tool or tool holder to the chuck.

A further object of the invention is to provide a chuck of the kind hereinbefore described and which is provided with means responsive to the movement of the tool locking means to its inoperative position to apply an ejecting force on the tool or tool holder supported in the chuck.

Another object of the invention is to provide a chuck having tool locking means releasable in response to the stopping of a normally rotatable operating member, and wherein the release operation of the locking means is effective following a time interval sufficient to enable stopping of the rotation of the operating member without subjecting the machine operator to the risk of injury.

Other objects and advantages of the invention will be pointed out specifically or will become apparent from the following description when it is considered in conjunction with the appended claims and the accompanying drawings, in which:

FIGURE 3 is a fragmentary sectional view taken on the line 3—3 of FIGURES 1 and 4;

FIGURE 4 is a sectional view taken on the line 4—4 of FIGURE 3 and illustrating the parts in the positions they occupy when the tool holder is locked in the chuck;

FIGURE 5 is a fragmentary view, similar to FIGURE 4, and illustrating the parts in the positions they occupy when the locking mechanism has been adjusted to its nonlocking position;

FIGURE 6 is a sectional view taken on the line 6—6 of FIGURE 3 and illustrating the parts in the positions they occupy when the tool holder is locked in the chuck;

FIGURE 7 is a view similar to FIGURE 6, but illustrating the parts in the positions they occupy when the locking mechanism is moved to its nonlocking position;

Figure 14:
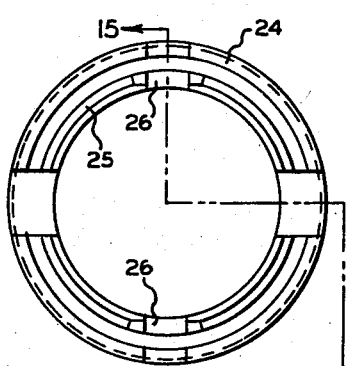
Figure 15:
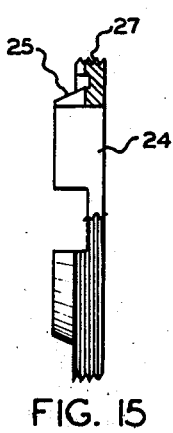

FIGURES 8, 9, 10, 11, 12 and 13 are sectional views taken on the lines 8—8, 9—9, 10—10, 11—11, 12—12, and 13—13, respectively, of FIGURE 4;

FIGURE 14 is a rear elevational view of an actuating cam for effecting movement of the locking means;

FIGURE 15 is a sectional view taken on the line 15—15 of FIGURE 14;

FIGURE 16 is a front elevational view of a rear cam ring;

FIGURE 17 is a sectional view taken on the line 17—17 of FIGURE 16;

FIGURE 18 is a front perspective view of an ejecting ring;

FIGURE 19 is a rear elevational view of an operating cam ring;

FIGURE 20 is a front elevation of the operating cam ring;

FIGURE 21 is a sectional view taken on the lines 21—21 of FIGURES 19 and 20;

FIGURE 22 is a rear elevational view of a drive transmitting cam ring; and

FIGURE 23 is a sectional view taken on the line 23—23 of FIGURE 22.

A chuck constructed in accordance with the invention is designated generally by the reference character 1 and comprises a generally cylindrical body 2 from one end of which extends a tapered shank 3 that is adapted to be accommodated in a substantially correspondingly tapered socket 4 of a rotary spindle 5 of a machine tool. The body 2 is provided with a tapered bore 6 that is adapted for the removable reception of a correspondingly tapered shank 7 of a tool holder 8 in which a drill 9 or other tool is mounted. The tool holder shank 7 terminates at one end in an enlarged flange 10 and is provided adjacent its other end with an annular groove 11. A tool having a similar shank could be substituted for the tool holder.

At the rear end of the body 2 is fixed an end wall 12 (FIGURE 4) the periphery of which is chamfered to provide a shoulder 13. The forward or open end of the body 2 is provided with a reduced diameter, externally threaded extension 14 on which is threaded a front disk or wall 15 which is provided with three equally spaced, radially extending openings 16 as is best shown in FIGURE 3. The periphery of the wall 15 also is chamfered to provide a shoulder 17. Spanning the distance between the walls 12 and 15 is an externally knurled, operating sleeve or collar 18 that is journaled on the shoulders 13 and 17 for unlimited rotation relatively to the body 2. As is shown in FIGURE 4, the diameter of the walls 12 and 15 is substantially greater than the diameter of the body 2 so as to provide an annular chamber 19 between the body and the collar 18.

Figure 1:
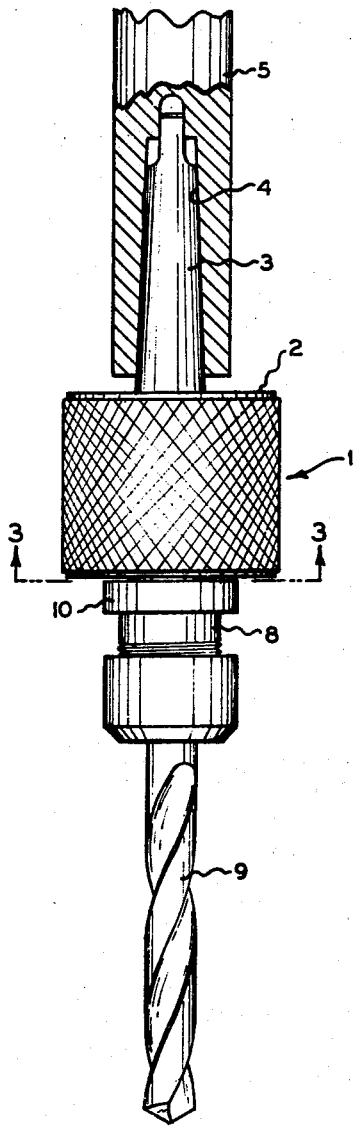
FIGURE 1 is a view partly in elevation and partly in section of a chuck constructed in accordance with the invention mounted in a rotating spindle of a machine tool and supporting a tool and tool holder.
Figure 2:
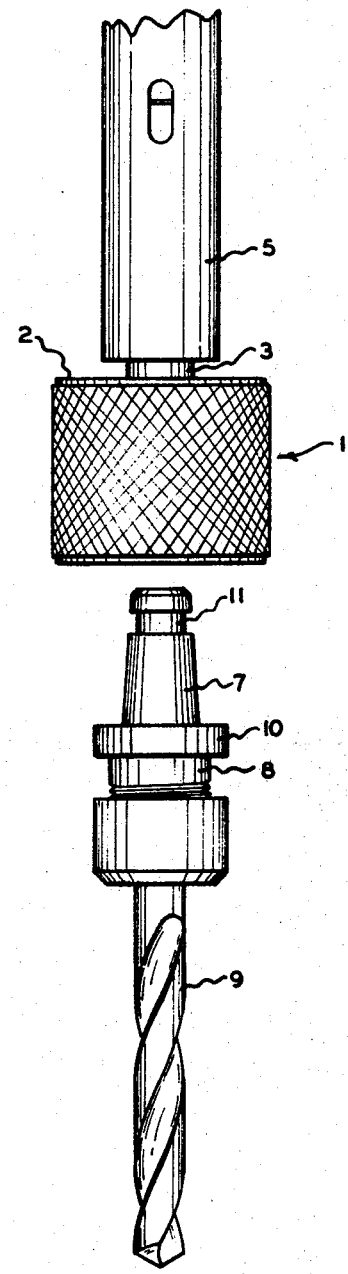
FIGURE 2 is a view similar to FIGURE 1, but showing the tool and tool holder separated from the chuck.
Figure 10:
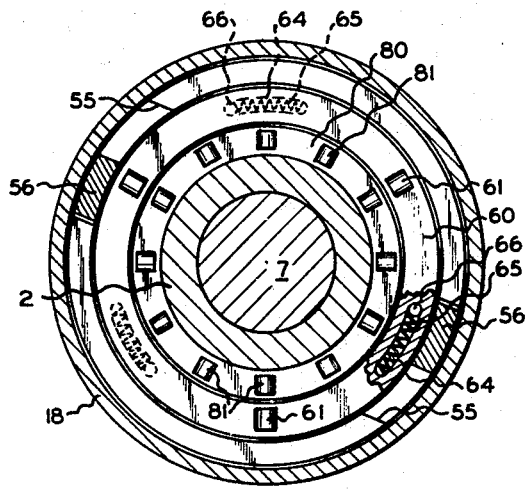
Figure 11:
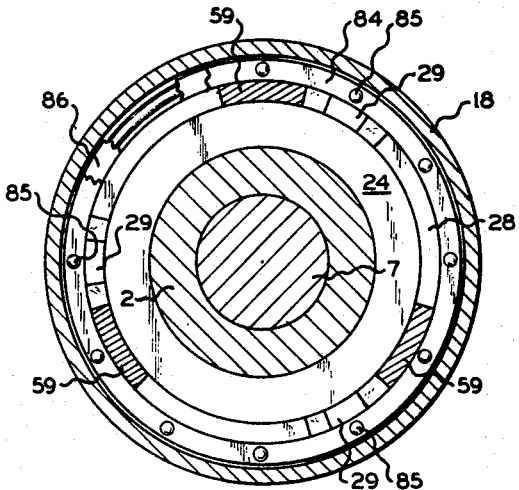
Figure 12:
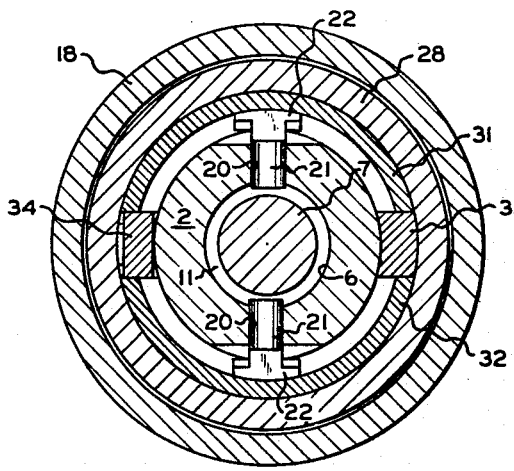
Figure 13:
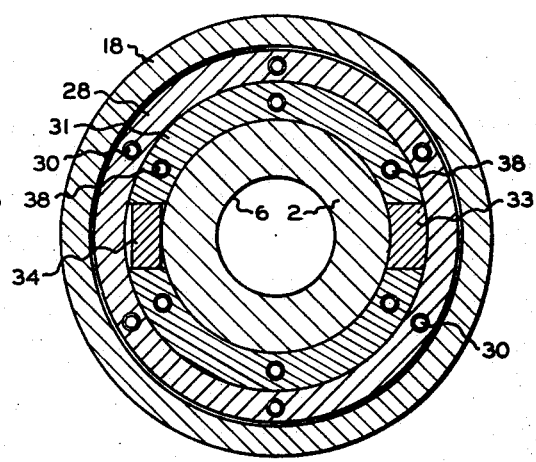

The body 2 is provided with a pair of diametrically opposed, radially extending, rearwardly inclined passages 20 establishing communication between the bore 6 and the chamber 19 and in each of which is a slidable, T-shaped locking dog 21 (see FIGURE 12). Each dog 21 is provided with a head 22 located in the chamber 19. The locking dogs 21 are adapted to be moved from a locking position as shown in FIGURE 4 in which their radially inner ends project into the bore 6 for accommodation in the tool holder groove 11 to an unlocking position as shown in FIGURE 5 and in which the dogs are retracted from the groove 11.

Actuating means for retracting the locking dogs 21 from their locking or operative position to their inoperative position or unlockin g position comprises a cam ring 24 which is axially slidable on the body 2 and has a rearwardly extending, radially inwardly inclined cam surface 25 that is provided with two diametrically opposed gaps 26 (FIGURE 14) by means of which the cam surface 25 is capable of straddling each of the dogs 21 beneath the respective heads 22 thereof. The periphery of the ring 24 is threaded as at 27 and is threaded into a rear cam ring 28 having three forwardly projecting, uniformly spaced, truncated, pyramid-shaped cam surfaces 29 (see FIGURES 16 and 17) which are interiorly threaded to receive the ring 24. The rear face of the ring 28 is flat and is provided with a plurality of blind bores 29a in each of which is accommodated a compression spring 30 that bears against the rear wall 12 and constantly urges the rings 28 and 24 forwardly.

Interposed between the body 2 and the ring 28 is a locking ring 23 composed of a pair of arcuate ring segments 31 and 32 which are reciprocable axially of the body. Between confronting ends of the ring segments 31 and 32 is a spacer 33 (see FIGURES 6, 7, 12 and 13) that is fixed to the body 2 by a pin 33a. Between the other confronting ends of the ring segments 31 and 32 is an axially slidable bushing 34. At the forward end of each ring segment 31 and 32 is a pair of axially spaced cam surfaces 35 and 36 that are adapted to bear against the head of the locking dogs 21. The rear face of each ring segment 31 and 32 is flat but each segment is provided with a plurality of openings 37 in each of which is accommodated a compression spring 38 which constantly urges the ring segments forwardly.

The construction and arrangement of the ring segments 31 and 32 are such that, when they are in their forward positions indicated in FIGURE 4, the surfaces 35 overlie and bear against the heads 22 of the locking dogs 21 and maintain the latter in their projected or locking positions. When the ring segments are in their rearward positions indicated in FIGURE 5, the surfaces 36 overlie the heads of the locking dogs and enable them to be retracted from the bore 6 into their unlocking positions.

Latching means 40 is provided for releasably latching the dogs 21 in their inoperative or retracted positions and comprises a radially reciprocable pin 41 (FIGURES 6 and 7) mounted in an opeing 42 which communicates between the bore 6 and the chamber 19 in a position to receive an operating plunger 43 carried by a thimble 44 that is threadedly received in the ring 28 and extends into the bushing 34. A spring 45 constantly acts on the plunger 43 urging the latter radially inwardly so that, when the ring members 28, 31 and 32 are in their rearward positions as shown in FIGURE 5, the plunger 43 may enter the opening 42 and project the latch pin 41 into the bore 6. When the plunger 43 is accommodated in the opening 42, the plunger prevents the ring members 28, 31 and 32 from being moved forwardly by their respective springs 30 and 38. As a consequence, the cam ring 24 will be maintained in such position with respect to the dogs 21 that the latter will be held in their nonlocking positions. The latching device 40, together with the pin 33a and the members 33 and 34, precludes rotation of the ring members 28, 31 and 32 relatively to each other and to the body 2.

The actuating cam ring 24 is operated by rotatable driving means 47 and rotatable drive transmitting means 48. The driving means comprises an annular ring 49 (FIGURES 19–21) that is journaled on the body 2 and has a peripheral flange 50 which is exteriorly threaded as at 51 and threaded into the correspondingly threaded end of the sleeve 18. Diametrically opposed set screws 52 fix the ring 49 to the sleeve 18 so as to preclude relative rotation therebetween.

The drive transmitting means 48 comprises a ring 53 (FIGURES 10, 22 and 23) journaled on a thrust ring 54 carried by the body 2 and having adjacent its periphery a pair of forwardly opening, elongated timing or lost motion slots 55. The drive ring 49 includes a pair of rearwardly projecting drive lugs 56 that are accommodated in the slots 55. The angular length of the slots 55 is greater than the angular length of the lubs 56, thereby providing for limited or timed relative rotation of the rings 49 and 53 for a purpose presently to be explained.

The driving ring 49 has a flat rear surface 57 adjacent its periphery against which the front surface 58 of the ring 53 bears so as to prevent forward displacement of the ring 53 axially of the body 2. On the rear surface of the ring 53 are three rearwardly extending, generally pyramid-shaped cams 59 which confront and are adapted to cooperate with the cams 29 on the ring 28 in response to relative rotation of the rings 53 and 28 so as to effect axial rearward displacement of the ring 28, the ring segments 31 and 32, and the actuating cam ring 24.

Interposed between the rings 49 and 53 is a bearing ring 60 (see FIGURES 4, 5 and 10) in which is mounted a plurality of rollers 61. The rollers bear against rearwardly inclined cam surfaces 62 (FIGURE 21) on the ring 49 and against the flat forward surface of the ring 53. The bearing ring 60 also is provided with a plurality of grooves 64 (see FIGURE 10) in its rear surface and in each of which is a compression spring 65. The ring 53 is provided with a corresponding plurality of forwardly projecting pins 66 (FIGURE 23) the forward ends of which extend into the grooves 64 and are abutted by the associated springs 65.

The construction and arrangement of the driving means 47, the drive transmitting means 48 and the bearing ring 60 are such that rotation of the ring 49 relatively to the body 2 by means of the operator's grasping the sleeve 18 causes the ring 49 to rotate relatively to the drive transmitting ring 53 for a short period of time, i.e., until the driving lugs 56 bear against corresponding ends of the slots 55 in the ring 53. This time period is sufficient to enable the operator to stop gradually the rotation of the sleeve 18 and the ring 49 so as to avoid burning or chafing of his hand. The relative movement of the rings 49 and 53 will cause the rollers 61 in the bearing ring 60 to traverse the cams 62 on the ring 49 and displace the ring 53 a short distance rearwardly, the pins 66 compressing the springs 65. Further rotation of the drive ring 49 will effect conjoint rotation of the ring 53, thereby causing the cams 59 and 29 on the rings 53 and 28, respectively, to displace the ring 28 and its associated parts rearwardly. As the ring 28 moves rearwardly, the locking ring segments 31 and 32 also will move rearwardly, thereby conditioning the locking dogs 21 for radially outward movement under the influence of the cam 26 on the ring 24. Upon rearward movement of the ring 28 a distance sufficient to enable the latching plunger 43 to enter the opening 42, the ring 28 and its associated parts will be latched in their rearward positions. The load of the springs 30 and 38 thus will be relieved from the ring 53, whereupon the compressed springs 65 act on the pins 66 and restore the bearing ring 60 to its initial position and enable the drive transmitting ring 53 to move forwardly and provide clearance between the cams 29 and 59.

The chuck includes axially reciprocable tool holder ejecting means 68 operable by the drive ring 50 to initiate removal of a tool holder from the chuck. The ejecting means comprises a ring 69 (see FIGURE 18) slidably mounted on the body 2 and having a radial flange 70 nested within the drive ring 50. The ring 69 has three forwardly extending fingers 71 that are accommodated in the openings 16 of the front plate 15. The front surface of the flange 70 is provided with a plurality of blind bores 72 in each of which is a compression spring 73 (FIGURE 4) that bears against the rear surface of the plate 15 so as constantly to urge the ring 69 rearwardly.

Interposed between the rings 50 and 69 is a bearing ring 74 (see FIGURES 4, 5 and 9) in which is mounted a plurality of rollers 75 which bear against the rear surface of the flange 70 and against the forward surface of the ring 50. The forward surface of the ring 74 is provided with a plurality of arcuate grooves 76 in each of which is a compression spring 77. Projecting from the rear surface of the flange 70 of the ring 69 is a plurality of pins 78 the rearward ends of which are accommodated in the grooves 76. As is best illustrated in FIGURE 21, the forward surface of the drive ring 50 is provided with a plurality of forwardly inclined cams 79 on which the rollers 75 seat.

The rings 50 and 69 are maintained in close fitting but rotatable assembly by a thrust ring 80 (see FIGURES 4 and 10) having rollers 81 which bear against the rear surface of the ring 50 and against the forward surface of the bearing 54.

The construction and arrangement of the ejecting means 68 are such that rotation of the drive ring 50 relative to the body 2 in response to such rotation of the sleeve 18 in the manner aforesaid effects relative movement between the rings 50 and 69, whereupon the cams 79 act on the flange 69 via the rollers 75 to effect forward axial movement of the ring 69, thereby effecting forward movement of the lugs 71 and compression of the springs 73. As the rollers 75 traverse the cams 79, the ring 74 will rotate in one direction relative to the ring 69, thereby enabling the pins 78 to compress the springs 77. As the rollers move off the high ends of the cams, the springs 77 will expand and restore the ring 74 to its initial position as the spring 73 restores the ring 69 to its rearward position. This operation will be repeated as long as there is relative rotation between the rings 50 and 69.

As is best indicated in FIGURES 4 and 5, a cage 82 containing balls 83 is interposed between the front plate 15 and the drive ring 50 and a similar cage 84 containing balls 85 is interposed between the drive transmitting ring 53 and a bearing ring 86 mounted in the sleeve 18. The cages 82 and 84, together with their respective balls, provide relatively friction free rotation between the rings 50, 53 and the nonrotating parts of the assembly.

OPERATION

When it is desired to remove the tool holder 8 (or tool if no tool holder is used) from the chuck 1 without stopping rotation of the machine spindle 5, the operator grasps the sleeve 18 which at this time is rotating with the chuck. Upon the operator's seizing the sleeve 18 it will remain stationary even though the spindle 5 and the chuck shank 3 continue to rotate. Stopping the rotation of the sleeve 18 also causes the drive ring 50 to stop rotating, thereby enabling the drive lugs 56 to move to corresponding ends of the grooves 55 in the drive transmitting ring 53 and stop rotation of the latter. As the body 2 continues to rotate, the ring 28 and the ring segments 31 and 32 will continue to rotate along with the cam ring 24, whereupon the cams 29 on the ring 28 will react with the cams 59 on the ring 53 and effect rearward movement of the rings 24 and 28 and of the ring segments 31 and 32. As the cam ring 24 moves rearwardly, the cams 26 will move beneath the heads of the dogs 21 and retract the latter radially from the groove 11 in the shank 7 of the tool holder. Continued rearward movement of the cam ring 24 will cause the latter to retract the dogs 21 from the bore 6 to the position shown in FIGURE 5. At this time, the latching plunger 43 will be in a position to enter the opening 42.

Upon the stopping of rotation of the drive ring 50, continued rotation of the ejector ring 69 will enable the cams 79 on the ring 50 to exert a forward thrust on the ejector ring 69 so as to cause the fingers 71 to bear against the rear surface of the tool holder flange 10 and move the tool holder in a direction outwardly of the chuck body. In this connection, it should be noted that the cams 59 on the ring 53 are so arranged as to lead the cams 79 on the ring 50, thereby assuring retraction of the dogs 21 from the groove 11 prior to the application of an ejecting force on the tool holder by the ejecting means 68.

Following the application of an ejecting force on the tool holder, and forward movement of the latter, the latch plunger 43 will move the latch pin 41 into the bore 6, as is shown in FIGURE 7, thereby latching the cam ring 24 and its associated parts in their rearward positions so as to maintain the dogs 21 in their retracted positions. In these positions of the parts, the sleeve 18 may be released or held by the operator. If the sleeve 18 is held, the rings 50 and 53 will continue to remain stationary while the other parts continue to rotate and the ejecting fingers 71 will reciprocate. If the sleeve 18 is released, all of the parts will rotate in unison. In either event, the locking dogs 21 will be held in their retracted positions.

To reassembled the tool holder with the chuck, the shank 7 may be introduced to the bore 6 and moved rearwardly. As the shank moves rearwardly, its rear end will engage the latch pin 41 and displace it radially outwardly. As the pin moves outwardly, the plunger 43 also will be moved radialily outwardly of the opening 42, whereupon the springs 30 and 38 will move the ring 28, the ring segments 31 and 32 and the cam ring 24 forwardly. As the cam 26 is withdrawn from engagement with the dogs 21, and as the ring segments 31 and 32 move forwardly, the surfaces 35 of the ring segments will bear against the outer ends of the dogs 21 and force them radially inwardly into the groove 11, whereupon the tool holder will be locked in the chuck.

The disclosure is representative of a presently preferred embodiment of the invention but is intended to be illustrative rather than definitive thereof. The invention is defined in the claims.

What is claimed is:

1. A chuck construction comprising a body adapted to receive a tool or the like; locking means carried by said body for movement from a tool locking position to a nonlocking position; actuating means carried by said body member operable to effect movement of said locking means; operating means; means mounting said operating means on said body member for unlimited rotation relatively to said body member; and drive transmitting means reacting between said operating means and said actuating means for operating the latter in response to relative rotation of said operating means and said body member.

2. The construction set forth in claim 1 including latch means operable in response to movement of said locking means to said nonlocking position to latch said locking means in said nonlocking position.

3. The construction set forth in claim 1 wherein said locking menas comprises at least one dog movable substantially radially of said body and having a head at its radially outer end.

4. The construction set forth in claim 3 wherein said actuating means is movable axially of said body into engagement with said head.

5. The construction set forth in claim 3 wherein said actuating means includes a cam movable axially of said body into engagement with said head.

6. The construction set forth in claim 1 including holding means acting on said locking means when the latter is in its locking position and preventing movement of said locking means to said nonlocking position.

7. The construction set forth in claim 6 including means reacting between said holding means and said operating means in response to rotation of the latter relative to said body to move said holding means to a position to permit movement of said locking means to said nonlocking position.

8. The construction set forth in claim 6 wherein said holding means includes cam means operable to restore said locking means to said locking position.

9. The construction set forth in claim 1 including ejecting means movable axially of said body and drive means responsive to relative rotation of said operating means and said body to move said ejecting means.

10. The construction set forth in claim 9 wherein said drive means comprises a cam carried by said operating means.

11. The construction set forth in claim 9 wherein said drive means effects movement of said ejecting means following movement of said locking means to said nonlocking position.

12. A chuck for releasably mounting a tool or the like for rotation, said chuck comprising a body having a cavity therein for the accommodation of said tool; means for mounting said body on a rotatable spindle; at least one locking member carried by said body and movable into and out of said cavity into and out of locking engagement with said tool; an actuating member carried by said body for rotation therewith and for movements axially thereof; cam means carried by said actuating member operable in response to axial movement in one direction thereof to move said locking member out of said cavity; operating means carried by said body for unlimited rotation relative thereto; and drive transmitting means acting between said actuating means and said operating means in response to rotation of the latter relative to said body to move said actuating means axially in said one direction.

13. The construction set forth in claim 12 including holding means movable axially of said body from a first position in which it overlies said locking member and disables its movement out of said cavity to a second position in which said locking member is enabled to move out of said cavity.

14. The construction set forth in claim 13 including means reacting between said drive transmitting means and said holding means for moving the latter to said second position in response to rotation of said operating means relative to said body.

15. The construction set forth in claim 13 including means acting on said holding means and constantly biasing the latter toward said first position.

16. The construction set forth in claim 13 including latch means acting between said body and said holding means for latching the latter in said second position.

17. The construction set forth in claim 12 including ejecting means carried by said body for axial movement in a direction to eject said tool from said cavity and drive means operable in response to relative rotation between said body and said operating means to move said ejecting means in said direction.

18. The construction set forth in claim 17 wherein axial movement of said actuating means in said one direction leads axial movement of said ejecting means.

19. A chuck construction comprising a body adapted to receive a tool or the like; locking means carried by said body for movement from a tool locking position to a nonlocking position; actuating means carried by said body member operable to effect movement of said locking means; operating means; means mounting said operating means on said body member for unlimited rotation relatively to said body member; and lost motion drive transmitting means reacting between said operating means and said actuating means for operating the latter in timed relation and in response to relative rotation of said operating means and said body member.

20. The construction set forth in claim 19 wherein said lost motion drive transmitting means comprises driving means carried by said operating means and accommodated in slots formed in said actuating means, said slots being of greater size than said driving means.

References Cited

UNITED STATES PATENTS 3,396,981    8/1968    Hammond _____ 279—89

HAROLD D. WHITEHEAD, Primary Examiner
DONALD D. EVENSON, Assistant Examiner

U.S. Cl. X.R.

279—89